Figure 5:
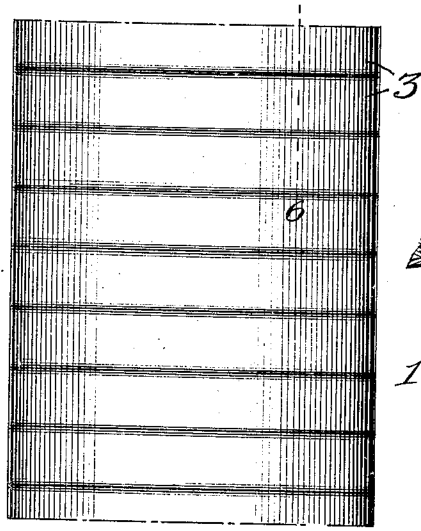

P. E. WIRT.
PROCESS FOR TIRE CONSTRUCTION.
APPLICATION FILED APR. 11, 1910.
1,009,365.
Patented Nov. 21, 1911.
6 SHEETS—SHEET 1.
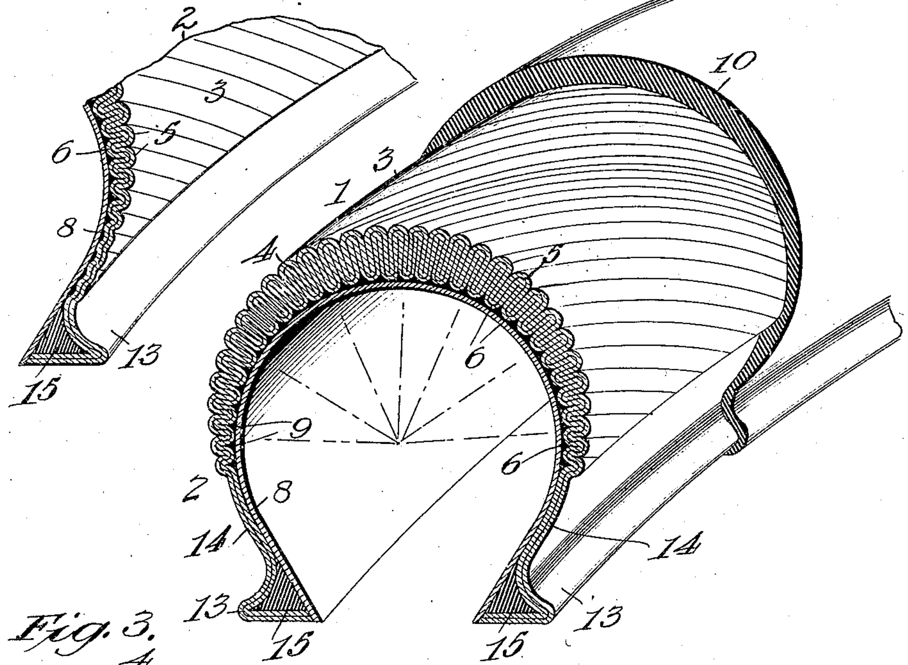
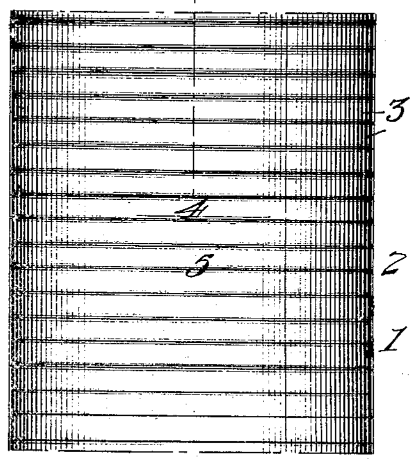
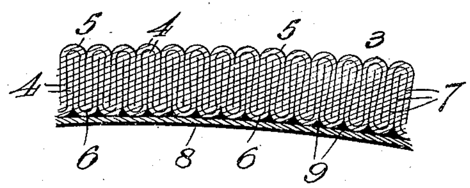
WITNESSES
T. L. Mockabee
Emory L. Groff
INVENTOR
Paul E. Wirt
By D. P. Wolhaupter
his Attorney

P. E. WIRT.

PROCESS FOR TIRE CONSTRUCTION.

APPLICATION FILED APR. 11, 1910.

1,009,365. Patented Nov. 21, 1911.

6 SHEETS—SHEET 2.

WITNESSES

T. L. Mockaue

Emory L. Groff.

INVENTOR

Paul E. Wirt

By D. P. Wolhaupter his Attorney

P. E. WIRT.

PROCESS FOR TIRE CONSTRUCTION.

APPLICATION FILED APR. 11, 1910.

1,009,365. Patented Nov. 21, 1911.

6 SHEETS—SHEET 3.

WITNESSES

T. L. Kochaker

Emory L. Groff

INVENTOR

Paul E. Wirt

By D. P. Wolhaupter his Attorney

P. E. WIRT.

PROCESS FOR TIRE CONSTRUCTION.

APPLICATION FILED APR. 11, 1910.

1,009,365. Patented Nov. 21, 1911.

6 SHEETS—SHEET 4.

WITNESSES

T. L. Mochane

Emory L. Groff.

INVENTOR

Paul E. Wirt

By D. P. Wolhaupter his Attorney

P. E. WIRT.

PROCESS FOR TIRE CONSTRUCTION.

APPLICATION FILED APR. 11, 1910.

1,009,365.

Patented Nov. 21, 1911.

6 SHEETS—SHEET 5.

WITNESSES

T. L. Mordaunt

Emory L. Groff.

INVENTOR

Paul E. Wirt

By D. P. Wolhaupter his Attorney

P. E. WIRT.
PROCESS FOR TIRE CONSTRUCTION.
APPLICATION FILED APR. 11, 1910.
1,009,365.
Patented Nov. 21, 1911.
6 SHEETS—SHEET 6.
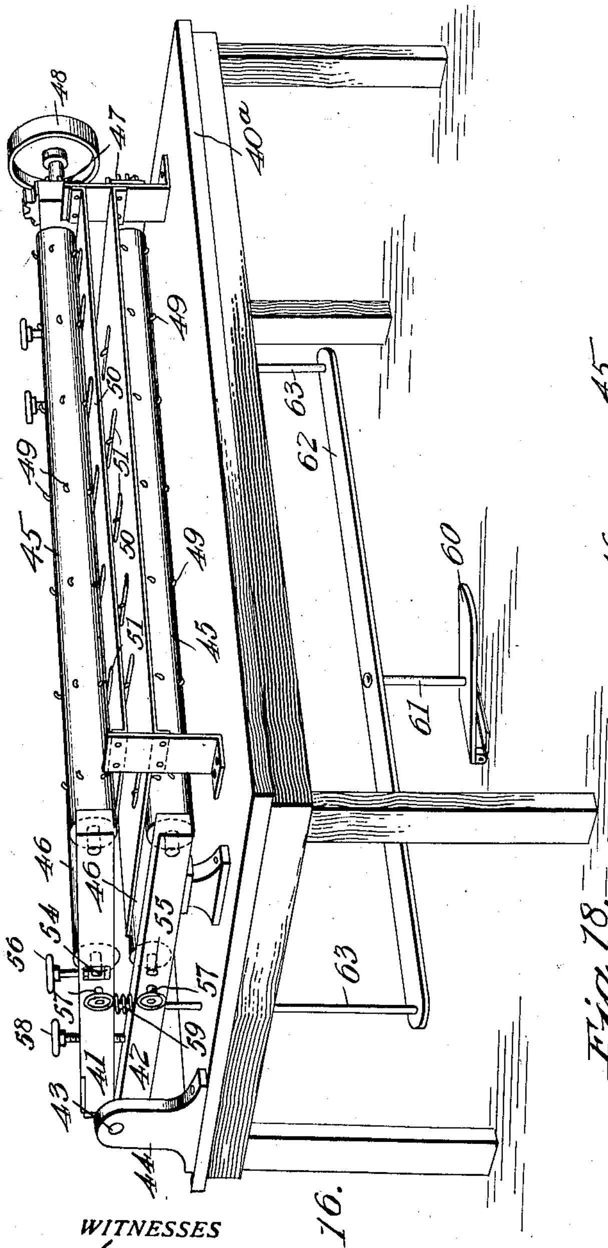
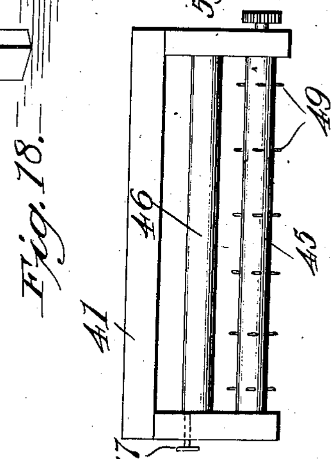
WITNESSES
T. L. Mockabee
Emory L. Groff
INVENTOR
Paul E. Wirt
By D. P. Wolhaupter
his Attorney

UNITED STATES PATENT OFFICE.

PAUL E. WIRT, OF BLOOMSBURG, PENNSYLVANIA.

PROCESS FOR TIRE CONSTRUCTION.

1,009,365. Specification of Letters Patent. Patented Nov. 21, 1911.

Application filed April 11, 1910. Serial No. 554,840.

*To all whom it may concern:*

Be it known that I, PAUL E. WIRT, a citizen of the United States, residing at Bloomsburg, in the county of Columbia and State of Pennsylvania, have invented certain new and useful Improvements in Processes for Tire Construction, of which the following is a specification.

This invention relates to the art of manufacturing tires for automobiles and other vehicles, and is intended as a carrying forward of the general principles of the inventions disclosed in and covered by my related patents dated March 15, 1910, and bearing numbers 951,869; 951,870; 951,871; 951,872, and 951,873, and more particularly as disclosed in the companion pending application filed August 11, 1909, Serial No. 512,399.

To this end the present invention contemplates an improved process for tire construction, particularly a material-shaping process that develops a body material of such form and characteristics as to provide, when incorporated in a tire construction, a tire having a maximum strength, integrity, resiliency, endurance, and yielding wearing face, together with a maximum resistance against perforations and other injuries.

While the present invention preserves the general structural features, and the accompanying advantages, of a laminated tire construction wherein flexible forming units of rubberized fabric are laid so as to present edges toward the wearing surface of the tire, it has more particularly in view the general improvement and perfection of that embodiment of the invention disclosed in the companion application aforesaid, wherein the body material of the tire is a puncture resisting member formed of sheet material gathered into a succession of folds presenting outer bights toward the wearing surface, in connection with an outer covering bonded onto said outer bights. This form of construction has been found to lend itself to the most ready and satisfactory manipulation and handling, in the formation of a tire, while at the same time possessing all of the desirable qualities which are demanded by the present day manufacturers and users of tires for motor vehicles.

To the end of improving and perfecting the folded fabric body material, the present invention proposes to prepare, shape, finish, and utilize such material in a manner that increased tensile strength is given to the entire body, and there is a closer bonding and bracing among the fibers and threads of the rubbered material than has heretofore been possible. Also, the improved process serves to effectually eliminate all air from between the laminæ and forces closer and more durable bondage between the rubbered surfaces which overlap each other. In the usual construction of tires, it very frequently occurs that in places the overlying sheets of fabric part or separate from the rubber bondage between them, and by so doing the case body is materially weakened at such places and "blow-outs" occur. Constant strain, thrust, and vibration will part the bondage between the layers composing the ordinary tire body, whereas, the construction provided for by the improved process claimed herein obviates this possibility by reason of providing a bondage between the respective layers of fabric which is greatly strengthened, braced, and protected on account of the closely lying and compacted folds.

The present invention is also intended to produce a structure wherein improved anchorage is provided for the outer rubber covering and tread, and to provide a construction which insures against "sand boils."

Further objects and advantages of the improved construction, developed and provided for by the process of the present invention, will hereinafter more fully appear, but another general object accomplished by the present invention is the production of a folded construction, which, owing to its character, provides a most flexible tire body, because the folds or rolls of material lying against each other, hinge, yield, or roll slightly against, or to and from one another, so that a most flexible body is provided; and when compacted and covered with rubber, they cannot part, but yield one against the other so as to produce great flexibility and to preserve great resiliency of the tire when inflated.

With these and the other objects in view hereinafter more particularly pointed out, the present invention consists in the novel series of steps herein fully described, illustrated and claimed.

The essential features of the invention, involved in carrying out the objects above indicated, are necessarily susceptible to a wide range of modification without departing from the spirit or scope of the invention, but for illustrative purposes, the preferred process steps are illustrated in the accompanying drawings, in which—

Figure 6:
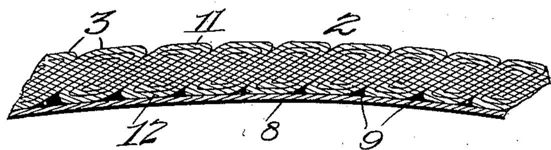
Figure 7:
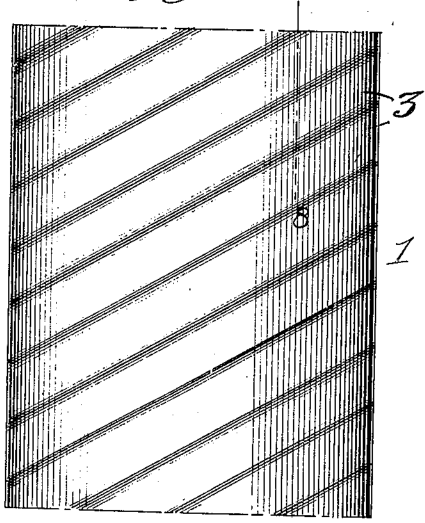
Figure 8:
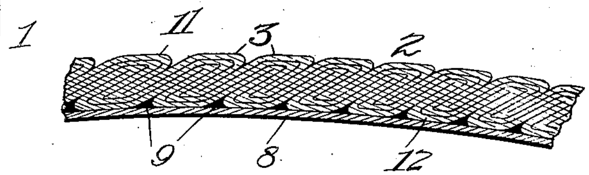
Figure 9:
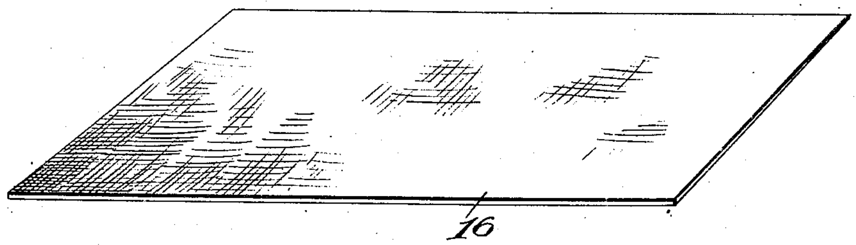
Figure 10:
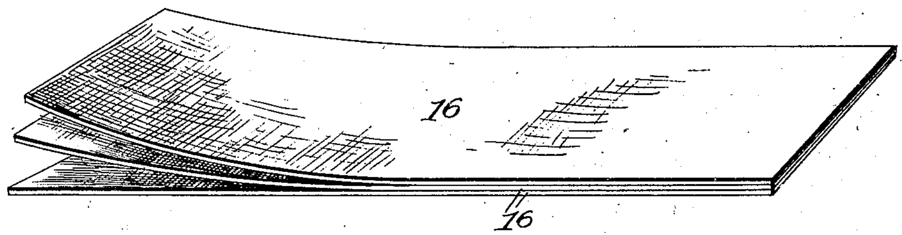
Figure 11:
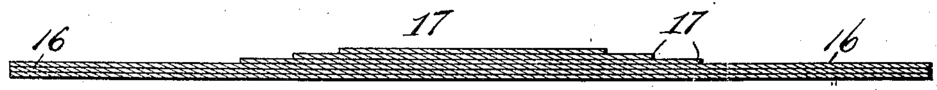
Figure 12:
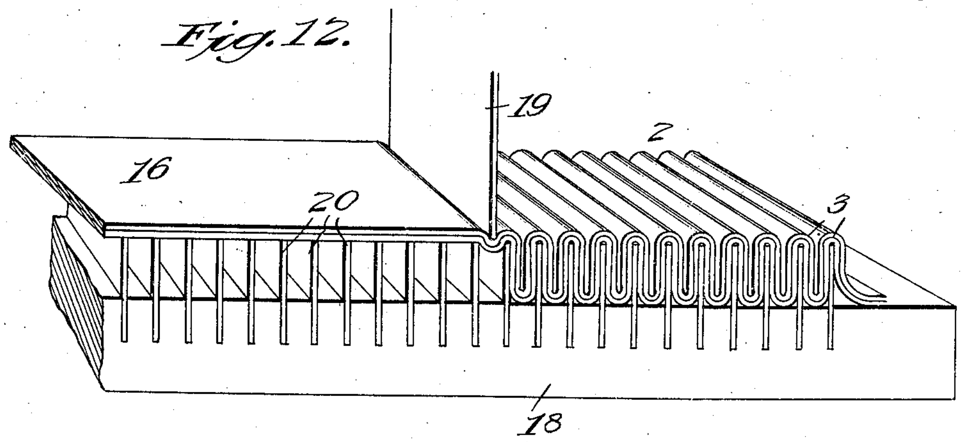
Figure 13:
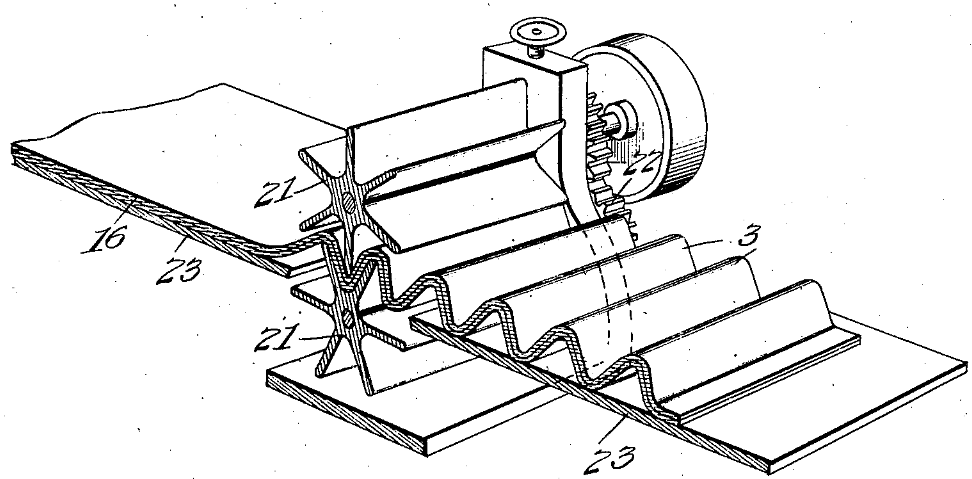
Figure 14:
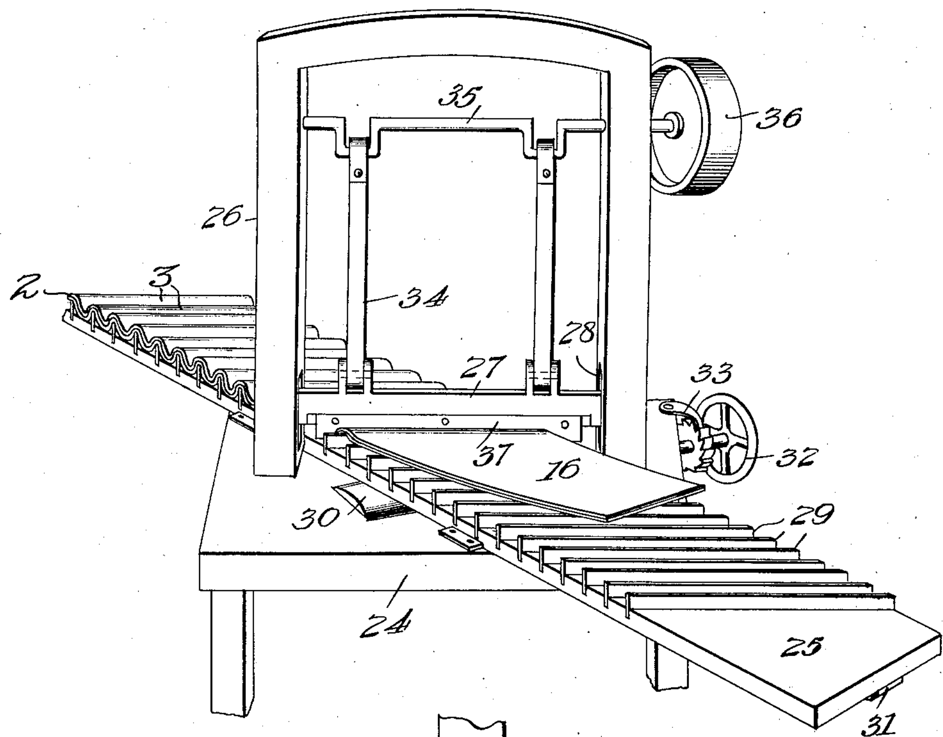
Figure 15:
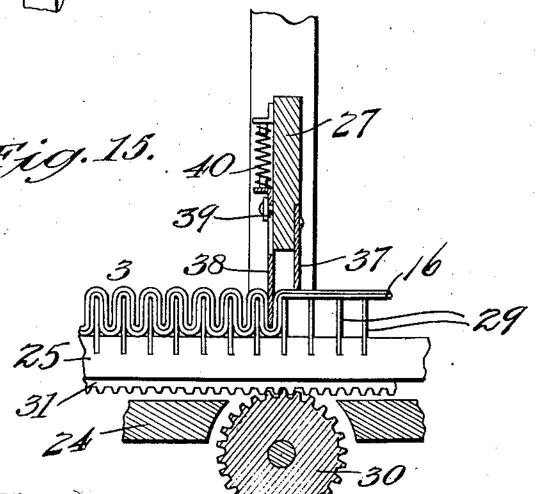

Figure 1 is a sectional perspective view of a pneumatic tire constructed in accordance with the present invention, and illustrating the folds of the material extending diagonally of the tire circumference; said view also illustrating one form of the construction wherein the folds are graduated in height, and also suggesting an expedient of leaving the edge portions of the material plain or uncorrugated to form the clencher elements. Fig. 2 is a fragmentary sectional view illustrating how the folded formation of the body material may be continued clear to the edges thereof, and the clencher elements formed by the compression of said folded material into the proper shape. Fig. 3 is a diagrammatic plan view of a tire body illustrating the arrangement of the body material with the folds thereof running transversely of the tire body. Fig. 4 is a detail sectional view through transverse running folds on a line of section indicated by the line 4—4 of Fig. 3 of the drawings; said view also illustrating what may be termed the perpendicularly standing folds. Fig. 5 is a diagrammatic view similar to Fig. 3 illustrating another embodiment of the invention wherein the folds of the body material are also disposed transversely of the tire circumference but have a slanting or oblique disposition with respect to the radii of the wheel. Fig. 6 is a sectional view of the form of folded body material wherein the folds maintain a slanting or oblique disposition with reference to the radii of the wheel; the line of section of Fig. 6 being indicated by the section line 6—6 on Fig. 5. Figs. 7 and 8 are views similar to Figs. 5 and 6 but illustrative of utilizing the slanting folds in a form of construction where the said folds extend diagonally of the tire circumference; the line of section for Fig. 8 being indicated by the line 8—8 on Fig. 7. Fig. 9 is a detail perspective view of a sheet of the rubberized fabric that is utilized in carrying forward the process of the present application. Fig. 10 is a perspective view illustrative of several of the fabric sheets or units adhesively compacted preparatory to making the same up into a body forming material. Fig. 11 is a sectional view through several sheets or layers of the rubberized fabric illustrating the thought of increasing the number of the layers or sheets toward and at the center of the pack to provide increased thickness of the material about the tread portion of the tire body. Fig. 12 is a perspective view of one type of fold gathering device that may be employed for producing and gathering a continuous succession of folds in the body material, irrespective of the number of layers or thicknesses of fabric sheets therein. Fig. 13 is a sectional perspective view of another type of fold gathering device for primarily gathering the body material into a succession of folds. Fig. 14 is a perspective view of another type of power operated fold gatherer, and illustrating an arrangement of parts which provides for producing diagonally running folds with facility and uniformity. Fig. 15 is a vertical cross sectional view of a portion of the device or machine shown in Fig. 14, illustrating more plainly the feeding mechanism for the forming board, and also illustrating more plainly the presser head carrying means for making the individual folds and for retaining or holding in shape the last formed fold. Fig. 16 is a perspective view of a form o fold compacting press that may be utilized in finishing the body material preparatory to incorporating the same in the tire body construction. Fig. 17 is an enlarged sectional view of a portion of the press shown in Fig. 16 illustrating more plainly the action of the compacting and pressure rolls and the feeding of the folded body material therethrough. Fig. 18 is a detail plan view of one of the roll carrying frames of the process shown in Fig. 16.

Like references designate corresponding parts in the several figures of the drawings.

It is the purpose of the present invention to provide an improved process for preparing, shaping, finishing and utilizing, for tire construction, a body material made of fabric sheets and of a folded formation. Hence, in carrying out the invention there is preserved the feature of a laminated body material for tire construction which may be described as being made up of closely and adhesively compacted outstanding fabric leaves, the laminated structure also including stout and substantial covering portions or members at the top and bottom of the joints between the leaves or laminations. This construction may obviously be embodied in a variety of forms without affecting the process claimed herein, but for purposes of illustration, there is shown in Fig. 1 of the drawings a pneumatic tire in which the entire body portion of the case is composed of the improved body material having the folded formation referred to. Referring particularly to said illustration in Fig. 1 of the drawings, the tire body or casing body is designated in its entirety by the numeral 1, and this body includes in its construction the folded body material which is separately designated by the reference numeral 2. This folded body material is composed of one or more sheets or layers of rubberized fabric widths adhesively compacted flat upon each other, and cut from the original sheet of material on the bias so as to present ends of threads toward the wearing surface. According to the present invention, the body material 2, whether in one or more layers, is subjected in its sheet form to the action of suitable devices, as hereinafter more particularly explained, which form, gather, and compact a continuous succession of folds or corrugations. These folds or corrugations are designated generally by the reference character 3 and may be said to comprise a plurality of flexible leaves or strips 4 adhesively compacted in face to face relation and arranged upright in the tire or casing body 1. That is, the term "upright" as applied to the disposition of the individual leaves or strips, is intended to refer to and define the outstanding arrangement of these leaves or strips and is also intended to include those phases of the invention where the folds stand perpendicularly, (in the plane of the radii of the tire) as indicated by the dotted lines in Fig. 1, or are oblique or aslant to the plane of the radii of the tire, as suggested in Figs. 6 and 8 of the drawings. However, in any disposition of the folds 3, with relation to the tire circumference or its radii, the individual folds necessarily include top and bottom bights 5 and 6 respectively, and these bights, in the folded fabric material, usually and preferably include several thicknesses or layers and subserve the function of covering members, inasmuch as they respectively lie at, and cover, the top and bottom of the line of contact or joints between the outstanding leaves or strips 4, thereby making a closed-in body material for the tire which preserves all of the functions and advantages of the tire constructions disclosed in my other patents aforesaid, with the additional provision of means for safe-guarding the tire or casing against the entry of foreign articles or sand therethrough. Also, the adhesive faces of this body material 2, when the folds or corrugations are closely compacted as hereinafter pointed out, necessarily provide interstitial layers 7 of rubber between the outstanding leaves 4, and these layers or fillings may or may not be amplified with additional rubber if so desired. Moreover, in forming the folded body material 2 about a core into tire form, it is preferable to finish off the inner side of the casing body by means of an inner fabric binder lining 8 with a soft rubber bond 9 interposed between said lining, and the under side of the body material 2, so that when the whole is vulcanized together, the lining 8 is effectually bonded onto the entire body as a part thereof, and, with the bond 9, provides a flexible base portion for the main body material. Also, in practice, an outer rubber surface covering 10 is placed about the folded body material 2 and is vulcanized thereon at the time the whole built up structure is vulcanized together. It will thus be seen that by reason of the folded or corrugated formation described for the body material 2, the same receives and retains about it, at top and bottom, and within the corrugations, a substantial body of soft rubber which materially contributes to the pliability and strength thereof, without affecting the general toughness of the fabric structure itself. Also, the corrugated formation lends itself more readily to a secure bonding of the parts, in vulcanizing, than would be otherwise possible.

In the construction described, the folded formation of the body material produces more flexibility and less rigidity than other laminated tread structures, and also, there is great strength and binding quality in the fabric sheets forming this body material, while at the same time there are no short lengths of thread or fiber at any point in the structure. Again, in the structure described, there is the same strength of material throughout, at the sides of the tire body as well as at the crown thereof, although as shown in Fig. 1 of the drawings, the outstanding folds may be graduated in height so as to diminish the height toward the sides of the tire structure, thus preserving the conventional cross sectional shape of a tire or casing body. Furthermore, the graduation in the height of the folds serves to present the higher folds at the crown of the tire body, and hence, at the tread portion so that the rubber covering 10 need not be greatly thickened at the tread of the tire body. However, this is simply one of the incidental phases of the invention, as it is to be understood that the latter contemplates a folded body material 2 in which the folds 3 thereof may be of uniform height and projection throughout, in which case the tread part of the tire may be thickened by any well known or approved means such for instance as providing the outer covering 10 with a central thickened tread part as is well understood by those familiar with the art. Furthermore, in the carrying forward of the invention, the direction in which the folds 3 run, is immaterial. For instance, as shown in Fig. 1 of the drawings, the folds 3 may be arranged to run diagonally across the tire circumference, with the result of providing a body structure which is not only very flexible and resilient, but at the same time resists the pulling apart strain, due to the frictional engagement of the tire with the ground, and also stoutly resists puncture. Again, as suggested in Figs. 3 and 4 of the drawings, the folds 3 of the body material may extend transversely of the tire body, at direct right angles to the longitudinal plane of the tire, while as illustrated by Figs. 5, 6, 7 and 8 of the drawings, not only the transverse and diagonal running of the folds with respect to the tire circumference may be followed out in building up a tire body or casing from the body material, but the disposition of the folds with respect to the tire radii may be altered from the upright or true radial position, that is to say, as suggested in Figs. 6 and 8 of the drawings, the outstanding or "upright" folds 3 may be so formed as to stand oblique or aslant to the radii of the tire or casing body. Also, in these forms of the invention, viz: the ones shown in Figs. 6 and 8 of the drawings, the oblique or slanting folds are crushed as indicated at 11 and 12 during the process of being pressed into the oblique or aslant position, with the result of securing greater compactness and overlapping of material, and consequently greater puncture resisting qualities.

Another phase of the invention is that of preparing, shaping, and finishing a folded body material which provides the main body portion of the tire body or casing, including the clencher elements 13 thereof. In one form of construction, as suggested in Fig. 1 of the drawings, the folds 3 of the body material may be diminished in height toward the side edges thereof so as to leave plain relatively thin edge portions 14 of the material which may be pressed into clencher form about the usual clencher core piece 15. However, as shown in Fig. 2 of the drawings, the folds or corrugations 3 of the body material may be, and preferably are, continued out to the extreme edges of the body material, and at such edges are subjected to a sufficient pressure about the core piece 15 to provide the clencher elements 13, all of which will be well understood by those familiar with the general practice of constructing tires.

Referring more particularly to the details of the process for producing the results above described, the first step is to cut one or more sheets of rubberized fabric 16 (see Fig. 9) in the required length and width. These sheets of rubberized fabric are also cut on the bias so as to present ends of threads toward the outer working surface of the tire. Any desired number of these sheets or layers of rubberized fabric are employed according to the size and strength of tire required, but preferably two or more of these sheets are packed together in face to face relation as suggested in Fig. 10 of the drawings. If it is desired to provide, in the body material itself, an extra thickness at the center line or tread portion of the tire or casing body, several graduated widths 17 of fabric sheets may be arranged at the center part of the body material as suggested in Fig. 11 of the drawings. In this connection, it will of course be understood that either in the single form shown in Fig. 9, or in the plural form shown in Figs. 10 and 11 the fabric body material is, according to the present invention, subjected to those steps of the process which provide for first gathering the material into a succession of folds, and then tightly compacting these folds into close and tight union, before placing the body material thus prepared about the core and building into a tire body of the character already described.

Referring particularly to that step of the process which provides for gathering the fabric sheets 16 into the folded body material 2, it will, of course, be understood that this may be done in various ways, either manually or by power. For instance, as suggested in Fig. 12 of the drawings, there may be employed a fold gathering device consisting of a forming board 18 and a reciprocal presser blade 19, the latter being plunged downwardly by hand or otherwise. The forming board 18 is illustrated as having set therein a plurality of upstanding regularly spaced ledger blades 20 between which blades the fabric sheets 16 are forced downwardly by means of the presser blade 19, thus producing folds or flutes of the character referred to. This device admits of the folds or flutes being formed in rather close order, but this step of the process can also be carried out in connection with a power machine or device of the character shown in Fig. 13 of the drawings. In the latter figure of the drawings there is shown a fold gathering device embodying in its general organization a pair of superposed winged fluting rollers 21—21, suitably geared and driven as indicated at 22, and so arranged that the wings of one roller operate in the recesses or spaces of the other roller. In this form of device or machine, the fabric sheets 16 supported by a suitable table or guide 23, in passing between the said rollers, are gathered into a succession of the folds 3. Furthermore, by way of illustrating the wide range of devices and apparatus that may be utilized in carrying out the present invention, reference is made to Figs. 14 and 15 of the drawings, wherein is shown a fold gathering device comprising in its general organization a supporting table 24, a sliding forming board 25, an upright frame 26 surmounting the table 24, and a reciprocating presser head 27 working in suitable guides 28 in the frame 26. The forming board 25, like the forming board 18 of Fig. 12, has fitted therein a plurality of upstanding regularly spaced ledger blades 29, and said board is mechanically fed by means of suitable feeding mechanism, such for instance as a toothed feed roller 30, suitably mounted in the table 24, and the toothed part of which engages a feed rack 31 fitted to the under side of the board 25, the axle of said roller 30 carrying a terminal hand wheel 32 and a pawl and ratchet holding device 33. This feeding mechanism is simply illustrative and shows a means whereby the forming board 25 may be mechanically advanced step by step, and held in each new position, while the reciprocating presser head 27 is operated. This presser head is connected by means of pitmen 34 with an operating crank shaft 35, which is in turn driven by any suitable means, such for instance as a driving belt engaging a band pulley 36 on the said shaft. The said presser head 27 has rigidly fixed thereto a vertically reciprocating presser blade 37 which is designed to engage the unfolded fabric sheets 16 and press them into the spaces between the upstanding ledger blades 29, and while this is being done, the last formed fold in the material is retained and held by a fold-retaining blade 38, slidably mounted as at 39 upon one side of the presser head 27 and normally thrust downwardly by means of a thrust spring or springs 40. The said spring or springs 40 are sufficiently strong to permit the blade 38 to be carried down into the last previously formed fold and to hold the same there while the presser head 27 continues downwardly in its movement and carries with it the presser blade 37 to gather the next fold in the fabric sheets, all of which will be apparent from the illustration of Fig. 15 of the drawings.

In connection with the fold gathering machine or device shown in Figs. 14 and 15 of the drawings, it will be observed that these figures illustrate a machine or apparatus for gathering diagonal folds in the material with facility and accuracy. This is very simply accomplished by setting the ledger blades 29 obliquely or diagonally with respect to the longitudinal plane of the board 25 and correspondingly setting the presser head 27 with its blades 37 and 38. This diagonal arrangement of parts is plainly shown in Fig. 14 of the drawings.

After the gathering or forming of the folds 3 in the body material, as above described, the next step in the process is to tightly and firmly compact these folds into close face to face adhesive contact. This may be variously provided for, but by way of illustrating a means for accomplishing this result, there is suggested in Figs. 16, 17 and 18 of the drawings a fold compacting press embodying means for finishing the body material into the form desired preparatory to its incorporation in the tire or casing body. The said fold compacting press includes a machine stand 40ª over which is arranged a pair of upper and lower roll carrying frames 41 and 42 respectively. These roll carrying frames are arranged in superposed relation and have a suitable hinged connection at one edge, as at 43, with the machine stand, preferably upon hinge brackets 44 mounted upon, and arising from, the table part of the said stand. The roll carrying frames are arranged one above the other, and each of the same has mounted therein a compacting roll 45 and a pressure finishing roll 46, the compacting and finishing rolls carried by the separate frames being respectively paired and arranged one above the other so that the gathered or loosely folded material first passes between the pair of compacting rolls, and is advanced from the latter toward and between the pressure finishing rolls, as plainly shown in Fig. 17 of the drawings.

The compacting rolls 45 are journaled in suitable bearings at their ends in the side edges of the frames 41 and 42, and at one end the said compacting rolls are preferably designed to be geared together by means of the gearing 47 and to be driven by means of a belt passing over a belt pulley 48 fitted to the shaft extremity of one of said compacting rolls, or by means of a crank or any other expedient which may be resorted to for positively rotating the compacting rolls and carrying the grab teeth 49 thereof against the individual folds of the body material to provide for compacting said folds and also for feeding the material toward and between the pressure finishing rolls 46. The gathered or folded body material is introduced between the upper and lower rolls of the press between suitably supported guide plates 50 arranged in spaced relation to provide a guideway therebetween, and which plates are provided with clearance slots 51 to permit the grab teeth 49 to project and work therethrough. Continuations 52 of the guide plates are preferably provided between the compacting and finishing rolls 45 and 46, and delivery guide plates 53 may be suitably supported beyond the delivering or discharging side of the finishing rolls 46. The pressure finishing rolls 46 are mounted in suitable bearings 54 and 55 respectively at the sides of frames carrying the same, the bearings 54 for the upper roll 46 being preferably in the form of a sliding bearing box adjusted vertically through the medium of adjusting screws 56 which assist in determining the pressure of the finishing rolls upon the material. Also, there is preferably associated with each finishing roll a brake which may be conveniently in the form of a retarding screw 57 mounted in the bearing frame and having a braking engagement with the end of the said rolls so as to retard the revolutions of said rolls as much as desired. In this connection it will be observed that by retarding the action of one of the rolls 46, to a greater extent than the other, and placing a proper pressure on said rolls, the oblique or slanting and somewhat crushed folded product shown in Figs. 6 and 8 of the drawings may be produced.

Of course, the same result could be accomplished by other means without departing from what is contemplated by the present process.

The limits within which the two rolls carrying frames 41 and 42 may be drawn together may be determined by the regulating screws 58 mounted in the side frame pieces of the upper frame 41 and bearing on the side frame pieces of the lower frame 42 as plainly shown in Fig. 16 of the drawings, and in order to provide means for mechanically opening and closing the two frames 41 and 42, opening springs 59 may be interposed between the said frames, and the treadle device associated therewith. This treadle device includes a suitably mounted treadle 60 having a link connection 61 with a cross bar 62, the extremities of the latter having pull rod connections 63 with the upper roll carrying frame 41. By means of the treadle bar and the springs 59, and the appropriate screws, the proper space may be maintained between all of the rolls to provide for packing the folds, and in fact securing all of the results herein pointed out with particularity.

In the general operation of the fold compacting and finishing press, it will be observed that through the proper setting of the pressure finishing rolls 46, the folds 3 in the body material are caused to be tightly and firmly compacted in face to face relation under the action of the teeth of the compacting rolls, and this compacting is further increased as the close fitting folds pass between the finishing rolls 46. Under uniform conditions, the folds will maintain their general perpendicularity as they pass between the said rolls, but in the event of one of said rolls being retarded to rotate at a less speed than the other, the slight slanting and somewhat crushed effect of Figs. 6 and 8 is produced, as will be well understood.

For the purposes of the present application the fold compacting and finishing press described is simply illustrative of one means for carrying out the compacting and finishing steps of the process, as it is intended to be understood that other means may be employed for the same purpose.

From the foregoing detailed description of the process, it will now be apparent that the increased tensile strength is given the tire body or casing by the close compacting and pressing of the rubbered fabric into flexible folds or close lying ribs, thereby accentuating or increasing the bond in the fiber composing the fiber, on the same principle that a tightly twisted cord is stronger than a loosely twisted one, or on the principle that the tensility of the single strip of rubbered fabric is greater when the strip is closely folded or rolled together than when flat. It will also be seen that after preparing a strip of body material in the manner herein described, the same adjusts itself readily to laying down upon a tire core in the usual well known way, and is then covered, as previously stated, to any extent with rubber at the tread and elsewhere, and then vulcanized in the usual manner. Owing to the peculiarity of construction in the folds which hinge against each other, and which may be easily spread or compacted in handling while laying up in tire form, the material lends itself readily to tubular formation without likelihood of trapping air at any place within the structure to interfere with perfect vulcanization.

As well known, it is a very troublesome feature in the present method of building tires to get the several respective leaves or thicknesses of fabric rolled down properly one upon the other to conform perfectly to the tire form or core upon which it is built. In contradistinction to this, the product of the present invention has already been perfectly compacted, and the many yielding and compressible or extensible folds serve to give it ready and absolute tractability in laying up in tire form without buckling or trapping air. The pliability or flexibility of the folded material is of the greatest advantage in the practical work of putting same into perfect tubular form. Also, the material employed is quite suitable, owing to its pliability or ductility to compression to any shape within limits, this being of special importance in admitting of the compression into the clencher elements as shown in Fig. 2.

In addition to the special advantages herein pointed out, the present invention provides a product preserving all of the desirable features and advantages of the structure disclosed in my several patents, and application aforesaid.

I claim:

1. A process for making a puncture-resisting part for tires, which consists in first preparing a fabric body material in sheet form, then gathering the said material into a folded formation, and subjecting the latter to compression upon its bights.

2. A process for tire construction, which consists in first preparing a fabric body material in sheet form, gathering the fabric sheet into a succession of similar folds, and then subjecting the folded formation to a pressure upon its bights that upsets the folds from the perpendicular.

3. A process for tire construction which consists in preparing a fabric body material in sheet form, then gathering said material into a folded formation, and then subjecting the folds to pressure at top and bottom to carry the same into oblique-standing position.

4. A process for tire construction which consists in first preparing fabric body material in sheet form, then gathering said material into closely compacted folds, next subjecting the folds to a crushing compression exerted upon the bights thereof, and finally shaping the folded structure into tire form.

5. A process for tire construction, which consists in first preparing a fabric body material in sheet form, then gathering said fabric sheet into a succession of diagonally running folds, and then subjecting said folds to crushing compression upon the bights thereof.

6. A process for tire construction which consists in first preparing a fabric body material in sheet form, then gathering said fabric sheet into folds, next drawing the folds together into compacted relation, and finally exerting a crushing pressure upon the bights of the folds.

7. A process for tire construction, which consists in first preparing a fabric body material in sheet form, then gathering said fabric sheet in folds, next drawing the folds closely together into compacted relation, then exerting a crushing pressure upon the bights of the folds, shaping the crushed folded structure into tire form with the outer bights of the folds presented toward the wearing surface, and finally bonding onto the folded structure a rubber covering.

8. A process for tire construction which consists in first preparing a fabric body material in sheet form, then forming said fabric sheet into a crushed folded formation, and finally shaping this crushed folded structure into tire form with clencher elements at its edges.

In testimony whereof I hereunto affix my signature in the presence of two witnesses.

PAUL E. WIRT.

Witnesses:
C. W. Funston,
E. H. Troxell.